3,169,826
METHOD OF PREPARING A HYDRATED
MAGNESIUM CARBONATE
Richard L. Pond, Livermore, and Leo F. Heneghan, San Mateo, Calif., assignors to Merck & Co., Inc., Rahway, N.J., a corporation of New Jersey
Filed Mar. 30, 1961, Ser. No. 99,494
1 Claim. (Cl. 23—67)

This invention relates to hydrated magnesium carbonates and more particularly it relates to compounds having the formula $$4MgO \cdot \frac{x}{2} CO_2 \cdot yH_2O$$

where $x$ is a number from 5 to 7 and $y$ is an integer from 9 to 13, processes for making these compounds, and compositions comprising the same.

Magnesium carbonate of the formula $$(MgCO_3)_3 \cdot Mg(OH)_2 \cdot 3H_2O$$

also written $$4MgO \cdot 3CO_2 \cdot 4H_2O$$

is well known in the art and is used for example in the rubber industry as a filler in white and light colored stocks. It is known that the presence of this material in rubber causes an improvement in the mechanical properties of the vulcanizate, particularly when high stiffness and high modulus are required.

The material has also found application in the manufacture of heat insulation material. For example, a formulation known as "85% Magnesia" comprises 85% magnesium carbonate, and 15% asbestos.

A significant drawback however, in expanding the utility of magnesium carbonate to other fields has been the inability of the compound to evolve carbon dioxide at temperatures below about 350° C. and water below for example 200° C. Thus, while it is a good filler for rubber, improving the mechanical properties thereof, and it aids in making good heat insulators, the prior art form of hydrated magnesium carbonate having the formula hereinabove presented, has found very little use as a blowing agent in foams for example or as a heat transfer medium in polymers due to its inability to evolve $CO_2$ and water at reasonable temperatures.

With respect to the polyurethane foam industry, a great need has developed for controlling the reaction between polyesters and polyisocyanates by adding water into the reaction mass at controlled rates, controlling the degree of foaming and foam cell diameter during the reaction, and increasing the amount of foaming after completion of the reaction.

It is apparent then, that the production of these foams would be simplified if there were available a compound which liberated water at a relatively low rate and at a temperature below about 100° C. to control the rate of foaming during the reaction, and at the same time possess the ability to evolve an inert gas such as carbon dioxide at a controlled rate, at a temperature below 200° C. after the reaction is complete to increase the amount of foaming.

Similarly, in the vulcanization of synthetic rubber such as for example chlorosulfonated polyethylene, where the vulcanization is catalyzed by small amounts of water, the method of introducing such water and the temperature at which the water is made available are determining factors in the processing safety and in the quality of rubber produced. For example, the availability of water at a temperature that is too low causes a premature vulcanization or scorching and this water is then not available during curing to activate the vulcanization. Thus, there is a real necessity for a water donor rubber additive which will release water during the cure at a rate which gives good dispersion in the cure mass and results in a vulcanized product having improved mechanical properties.

Similar problems have been encountered in the manufacture of articles from carboxyl modified nitrile rubber.

It is therefore an object of the present invention to provide a chemical compound that will liberate carbon dioxide at a temperature of less than 250° C. and water at a temperature of less than 100° C.

It is another object of this invention to provide a hydrated form of magnesium carbonate that will liberate carbon dioxide at a temperature of less than 250° C., and that will liberate water at a temperature less than 100° C. at atmospheric pressure.

Still another object of the present invention is to provide a hydrated form of magnesium carbonate that will effect an improvement in the mechanical properties of chlorosulfonated polyethylene and carboxynitrile rubber, to an extent heretofore unknown.

A further object of this invention is to provide a method for making a hydrated form of magnesium carbonate which evolves water at a temperature less than 100° C. and carbon dioxide at a temperature less than 250° C.

Another object of this invention is to provide a dry, solid substance which will release water at a controlled rate during the vulcanization of vulcanizable rubbers.

Still a further object of this invention is to provide an inexpensive, non-toxic blowing agent in the preparation of polymeric foams.

Another object of this invention is to provide an inexpensive, non-toxic, controlled water donor in the preparation of polymeric foams.

These and other objects will be apparent when the detailed disclosure hereinafter presented is considered in conjunction with the accompanying drawings wherein.

Figure 1:
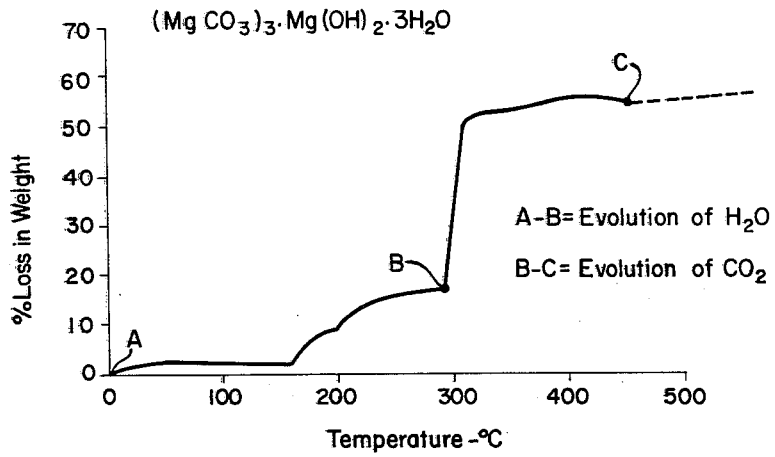
FIGURE 1 is a graphical representation of the decomposition of the prior art form of hydrated magnesium carbonate.

In general the method of preparing the hydrated magnesium carbonates of the present invention having the formula $$4MgO \cdot \frac{x}{2} CO_2 \cdot yH_2O$$

where $x$ may be a number from 5 to 7 and $y$ may be an integer from 9 to 13, includes the steps of forming a slurry of magnesium hydroxide in water, introducing $CO_2$ into the slurry until the pH thereof is between 7.5 and 9, separating the solid portion of the slurry from the liquid portion of the slurry and drying the solid.

In practising the method of the present invention, the suspension of magnesium hydroxide preferably contains between 0.3 and 0.5 pound of magnesium hydroxide per gallon of solution, although the amount is limited only by that which may conveniently be handled in the suspension. The $CO_2$ may be introduced into the magnesium hydroxide-water slurry by any convenient means such as by sparging therein gas mixtures containing $CO_2$, or by introducing solid $CO_2$ therein. It has been found that flue gas containing about 10% $CO_2$ is suitable for this purpose in that it is easily accessible and produces the desired results. The rate of gas sparging is not critical and may be controlled at a level which is practicable with regard to safety and economic considerations. When flue gas containing about 10% $CO_2$ is used, a sparging rate of about 2–3 ft.³ $CO_2$ per hour per gallon of magnesium hydroxide suspension is convenient.

With regard to the amount of $CO_2$ introduced into the magnesium hydroxide suspension, particular success in obtaining hydrated magnesium carbonates which evolve water at less than about 100° C. and $CO_2$ at less than about 250° C., is achieved when the sparging of $CO_2$ into the magnesium hydroxide slurry is ceased when the pH thereof is between approximately 8.0 and 8.6.

When the desired pH is reached, the solid portion of the slurry is removed from the liquid portion as for example by filtering or centrifuging. The solid so obtained should be dried at a temperature less than about 75° C. The drying may be carried out in a spray drier, or some other suitable drying apparatus.

There is thus obtained a compound having the formula $$4MgO \cdot \frac{x}{2}CO_2 \cdot yH_2O$$

wherein $x$ is a number from 5 to 7 and $y$ is an integer from 9 to 13, the precise values of which are dependent upon the aforementioned process variables.

Referring now to the drawings, there is shown a thermal decomposition curve for the magnesium carbonate of the present invention as compared to that of the prior art form of hydrated magnesium carbonate.

Specifically, FIGURE 1 which represents the prior art form of magnesium carbonate, shows that very little $H_2O$ is evolved at temperatures up to about 160° C. At this temperature approximately 98% of the original solid weight still remains. As the temperature is increased to about 300° C. some additional $H_2O$ is evolved, but there still remains more than 82% of the original solid weight. At temperatures around 300° C. there is a rapid evolution of carbon dioxide which tapers off as temperatures in excess of about 300° C. are reached. It can be seen then, that the prior art form of hydrated magnesium carbonate exhibits an insensitive dependency of gas evolution on temperature which presents a difficult control problem in applications utilizing the gas evolution property.

Figure 2:
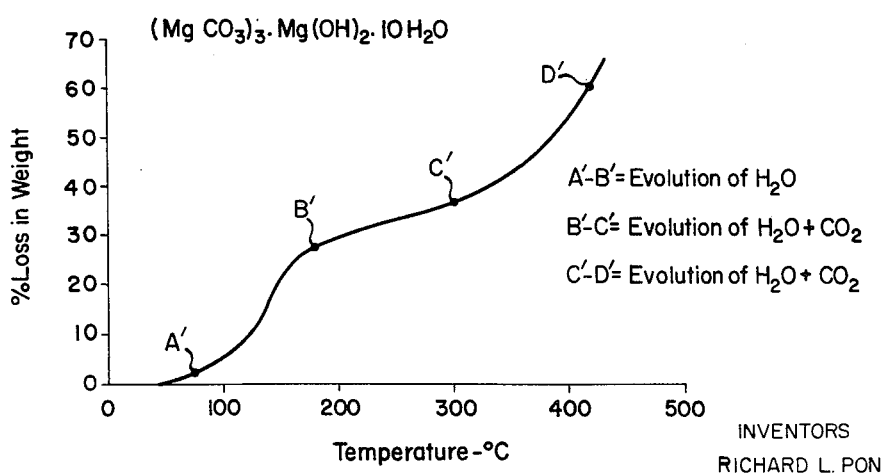
FIGURE 2 is a graphical representation of the decomposition of the hydrated magnesium carbonate of the present invention.

FIGURE 2 demonstrates the constant, temperature-sensitive thermal decomposition curve of a hydrated magnesium carbonate of the present invention having the formula $$(MgCO_3)_3 \cdot Mg(OH)_2 \cdot 10H_2O$$

The evolution of $H_2O$ commence as temperatures above about 75° C. are reached, and continues at an increasing rate until 180° C. is approached. Up to this point enough $H_2O$ is evolved to reduce the solid weight to about 72% of its original value. Above 180° C. $CO_2$ begins to come off in combination with more $H_2O$ until a temperature of about 300° C. is reached. At this point $CO_2$ is evolved at a rapid rate and continues so to be evolved until the decomposition is complete at temperatures slightly above 400° C. It is apparent then that the hydrated magnesium carbonate of the present invention possesses temperature-sensitive gas evolution characteristics which are desirable in the preparation of, for example, polymeric foams and insulating materials.

The invention will be further described by the following specific examples, but it will be understood that these are presented for purposes of illustration only and are not intended to limit the scope of the invention.

*Example 1*

PREPARATION OF HYDRATED MAGNESIUM CARBONATE HAVING THE FORMULA $(MgCO_3)_3 \cdot Mg(OH)_2 \cdot 10H_2O$ (ALSO WRITTEN $4MgO \cdot 3CO_2 \cdot 11H_2O$)

Finely divided precipitated magnesium hydroxide is mixed with water and a suspension is formed which contains 0.39 lb. of magnesium hydroxide per gallon of solution.

1700 gallons of this suspension is then charged to a stainless steel kettle. Flue gas containing 10% $CO_2$ by volume is then sparged into this slurry at a rate of about 500 cubic feet per hour. The sparging is continued until a pH of about 8.3 in the reaction mass is obtained. This represents a period of about 4.2 hours of sparging. The carbonated slurry is then filtered on an Oliver filter and the precipitate washed with water. The washed filter cake is then repulped with water whereby a slurry which contains .50 lb. per gallon is formed. The resulting slurry is then spray dried at a temperature of about 67° C. The resulting product has the formula $$(MgCO_3)_3 \cdot Mg(OH)_2 \cdot 10H_2O, \; (4MgO \cdot 3CO_2 \cdot 11H_2O)$$

The compound has the following physical analysis.

Specific gravity _____ 1.83.
Bulk (loose) _____ 18.0 p.c.f.
Screen analysis:
   Through 100 mesh _____ 100.0%.
   Through 200 mesh _____ 100.0%.
   Through 325 mesh _____ 99.5%.
Particle size, average: (Fisher Sub Sieve Sizer) _____ 3.84μ.

The compound decomposes upon heating with evolution of water and carbon dioxide as follows:

| Temperature | Gas Evolved | Percent of Original Weight |
|---|---|---|
| 75° C. to 110° C. | $H_2O$ | 21 |
| 110° C. to 170° C. | $H_2O$ | 6 |
| Above 170° C. | $H_2O + CO_2$ | 41 |

*Example 2*

PREPARATION OF POLYURETHAN FOAM CONTAINING HYDRATED MAGNESIUM CARBONATE OF THE FORMULA $(MgCO_3)_3 \cdot Mg(OH)_2 \cdot 10H_2O$ 10 parts of weight by hydrated magnesium carbonate having the formula $$(MgCO_3)_3 \cdot Mg(OH)_2 \cdot 10H_2O$$

is mixed with 1,000 parts by weight of glycol-adipic acid polyester which has an OH value of 52 and an acid value of 1. The resulting mixture is caused to react with 200 parts by weight of 1,5-naphthalene diisocyanate for a period of 30 minutes at a temperature of 130° C. As the reaction proceeds, the temperature increases until at the end of the 30 minute period the temperature reaches 150° C. During the reaction foaming takes place to a small extent. When 2,000 parts of water are added to the resulting reaction mass at a temperature of 135° C., foaming of the resulting mix occurs, leading rapidly to the formation of a spongy mass having the following physical properties:

Tensile strength _____ 400 kg. per sq. cm.
Elongation at break _____ 700%.
Permanent set _____ 10%.
Tear resistance _____ 110 kg. per sq. cm.
Load 300° elongation _____ 95.
Barcol hardness (935 scale) _____ 90.
Resiliency _____ 50.

*Example 3*

INSULATING MATERIAL COMPRISING HYDRATED MAGNESIUM CARBONATE, HAVING THE FORMULA $(MgCO_3)_3 \cdot Mg(OH)_2 \cdot 10H_2O$ 100 pounds of hydrated magnesium carbonate, having the formula $$(MgCO_3)_3 \cdot Mg(OH)_2 \cdot 10H_2O$$

and produced by the process of Example 1 is added to 200 pounds of asbestos fiber (Quebec Standard Grade 5K).

The resulting mixture is intimately mixed with the following composition:

| | Pounds |
|---|---|
| Diatomaceous earth | 50 |
| Finely ground water granulated blast furnace slag | 200 |
| $Na_2CO_3$ | 8 |

The dry mixture of materials listed above is then mixed with 6,000 pounds of water in a 200 gallon vessel, agitated at 100 revolutions per minute, for a period of 30 minutes. The resulting slurry is then fed through a Bauer Pulper, thereby increasing the viscosity of the slurry. The highly viscous slurry is then poured into flat pans each having a depth of two inches. The pans are then placed into a streaming chamber, wherein they are subjected to a temperature of 105° C. and a pressure of 10 p.s.i.g. and steam, for a period of 2 hours. A spongy material forms in each pan. The spongy material is then broken up into particles of approximately 1 inch in diameter. These lumps are then placed in molds which conform to the shape of the insulation form desired. The mass within each mold is compressed to a volume which is 25% of the volume of the spongy material removed from the above-mentioned pans. The rate of compression in the mold is between ½ inch per second and 2 inches per second. The mold pressure is 100 pounds per square inch. The period of compression within the mold is five hours. After removal from the mold, the molded article is vacuum dried at a temperature of 40° C. and an absolute pressure of 0.05 pound per square inch, for a period of 8 hours.

Immediately after drying, one side of the insulation material is coated with a viscous solution consisting of 20% acetone and 80% polyvinyl alcohol. The article is then vacuum dried at 30° C. and 0.05 p.s.i.a. for a period of 5 hours.

The final product prior to coating with polyvinyl alcohol has the following properties.

(1) Dry density: 15 pounds per cubic foot;
(2) Drying shrinkage: 0.20%;
(3) When the insulation is heated at a temperature in the range from 170° C. up to 300° C., carbon dioxide is liberated at a rate of 0.3 mole of carbon dioxide per mole of hydrated magnesium carbonate per minute per B.t.u.

*Example 4*

CHLOROSULFONATED POLYETHYLENE COMPOSITIONS CONTAINING HYDRATED MAGNESIUM CARBONATE OF THE FORMULA $(MgCO_3)_3 \cdot Mg(OH)_2 \cdot 10H_2O$ The following compounding procedure is used to mix the constituents of the composition.

Chlorosulfonated polyethylene (mol. wt.=12,000, Resistivity=$1 \times 10^{14}$ ohm-cm.) is banded on the front roll of a standard laboratory mill, and the mill is operated until the band is smooth and free of holes. Hydrated magnesium carbonate prepared according to Example 1 is then added. Each of the other ingredients as hereinafter presented, is added evenly across the rolls and at a uniform rate and is assimilated into the mix before the next ingredient is added. After mixing, the batch is removed from the mill, check-weighed, and again placed into the mill. The rolls are set at a distance of 0.030 inch from each other. The stock is passed through the mill six times. The rolls are then set at a distance of 0.008 inch from each other. The stock is again passed through the mill ten times in succession. During the milling, water having a temperature of 65° F. is passed through the rolls. The stock is then sheeted from the mill and 3.6 hours later is cut into squares and vulcanized at 307° F. for varying periods of time. Standard ASTM tensile molds are used for the squares and conventional vulcanization techniques are employed.

The above-detailed procedure is followed in mixing the ingredients shown in Table I following:

TABLE I

| | |
|---|---|
| Hypalon 40 (1) | 100 parts. |
| Titanium dioxide (white) | 50 parts. |
| Calcium carbonate | 50 parts. |
| Tetrone A (2) | 2 parts. |
| Magnesium oxide (3) | As shown in Table II. |
| Hydrated magnesium carbonate prepared as in Example I | As shown in Table II. |
| Pentaerythritol 200 | As shown in Table II. |

(See Notes 1, 2, and 3 following Table II.)

The effect of varying amounts of the hydrated magnesium carbonate of the present invention on the physical properties of the vulcanized composition at various cure-rates is shown in Table II.

TABLE II

The following constituents were added to the first four ingredients shown in Table I. Quantities are given in parts per hundred parts Hypalon.

| | | | | | |
|---|---|---|---|---|---|
| Hydrated Magnesium carbonate | | 5.0 | 20.0 | | 20.0 |
| Pentaerythritol 200 | 3.0 | 3.0 | 3.0 | | |
| Magnesium Oxide | 5.0 | 5.0 | 5.0 | 20.0 | 20.0 |

MOONEY SCORCH AT 250° F.

| | | | | | |
|---|---|---|---|---|---|
| Min. Reading | 39 | 42 | 45 | 67 | 73 |
| $t_5$, min | 17 | 17 | 15 | 14 | 12 |
| $t_{10}$, min | 21 | 20 | 18 | 19 | 14 |
| $t_{35}$, min | 29 | 28 | 23 | | |

STRESS STRAIN AND HARDNESS

| | Curing Time Minutes | | | | | |
|---|---|---|---|---|---|---|
| Modulus, 300%, p.s.i | 7.5 | 1,210 | 1,380 | 1,180 | 1,390 | 1,740 |
| Tensile Strength, p.s.i | 7.5 | 2,500 | 2,510 | 2,030 | 1,830 | 2,130 |
| Elongation, percent | 15 | 490 | 440 | 400 | 520 | 330 |
| Shore Hardness | 30 | 73 | 75 | 81 | 75 | 83 |

AIR TEST TUBE AGING, 96 HRS AT 300° F.—CHANGES

| | | | | | |
|---|---|---|---|---|---|
| Tensile Strength, percent | 15 | −13 | 5 | 15 | −8 | 47 |
| Elongation, percent | 15 | −83 | −81 | −83 | −93 | −80 |
| Hardness Points change | 15 | 10 | 5 | 4 | 10 | 0 |

COMPRESSION SET, 30% DEFLECTION

| | | | | | |
|---|---|---|---|---|---|
| 70 hrs./212° F, percent | 35 | 82 | 75 | 76 | 83 | 71 |
| Color Change (aged) | 15 | 4 | 2 | 2 | 3 | 1 |

All tests performed according to ASTM standards.
Color change indicated as follows:
1—No change.
2—Slight yellowing.
3—Yellowing.
4—Browning.

NOTE 1.—Hypalon 40 is a form of chlorosulfonated polyethylene. It is manufactured by E. I. du Pont de Nemours & Co., Inc., Elastomer Chemicals Department, Wilmington 98, Delaware.

NOTE 2.—Tetrone A is a trade name of dipentamethylene-thiuram-tetrasulfide. It is manufactured by the E. I. du Pont de Nemours Co. of Wilmington, Del.

NOTE 3.—Magnesium oxide used in the formulations in this example has the following specification:

| | |
|---|---|
| Average particle size | 0.09 micron. |
| Bulk density | 23 lbs./cubic ft. |
| Specific gravity | 3.32. |

Although the foregoing examples have been given with respect to specific conditions, it will be understood that the scope of the present invention should not be limited thereto. It is intended that the appended claim encompass all changes and modifications as come within the scope of the invention.

What is claimed is:

The method for producing hydrated magnesium carbonate having the formula $$4MgO \cdot 3CO_2 \cdot 11H_2O$$

which comprises preparing a slurry of magnesium hydroxide and water, contacting said magnesium hydroxide slurry with carbon dioxide until the pH of the slurry is between approximately 8.0 and 8.6 thereby to form a hydrated magnesium carbonate and drying said hydrated magnesium carbonate at a temperature less than about 75° C. to form a hydrated magnesium carbonate having the formula $$4MgO \cdot 3CO_2 \cdot 11H_2O$$

References Cited in the file of this patent

UNITED STATES PATENTS

| | | |
|---|---|---|
| 534,213 | Endemann | Feb. 12, 1895 |
| 1,034,330 | Young | July 30, 1912 |
| 1,573,632 | Crowell | Feb. 16, 1926 |
| 2,357,987 | Winding | Sept. 12, 1944 |
| 2,779,689 | Reis | Jan. 29, 1957 |
| 2,895,926 | Rappaport | July 21, 1959 |

FOREIGN PATENTS

| | | |
|---|---|---|
| 778,120 | Great Britain | July 3, 1957 |

OTHER REFERENCES

Hoffman: Lexikon der Anorganischen Verbindungen, Band 1, Halfte 1 (1917), page 517.